(12) United States Patent
Kar

(10) Patent No.: US 9,309,824 B2
(45) Date of Patent: Apr. 12, 2016

(54) ENGINE CONTROL SYSTEMS AND METHODS FOR VEHICLE LAUNCH

(71) Applicant: GM GLOBAL TECHNOLOGY OPERATIONS LLC, Detroit, MI (US)

(72) Inventor: Krishnendu Kar, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 496 days.

(21) Appl. No.: 13/716,843

(22) Filed: Dec. 17, 2012

(65) Prior Publication Data

US 2014/0081559 A1     Mar. 20, 2014

Related U.S. Application Data

(60) Provisional application No. 61/702,398, filed on Sep. 18, 2012.

(51) Int. Cl.
| | |
|---|---|
| *F02D 41/02* | (2006.01) |
| *F02D 28/00* | (2006.01) |
| *F02D 41/14* | (2006.01) |
| *F02D 41/00* | (2006.01) |
| *F02D 13/02* | (2006.01) |
| *F02M 25/07* | (2006.01) |

(Continued)

(52) U.S. Cl.
CPC .......... *F02D 41/022* (2013.01); *F02D 13/0219* (2013.01); *F02D 28/00* (2013.01); *F02D 41/0002* (2013.01); *F02D 41/0007* (2013.01); *F02D 41/0225* (2013.01); *F02D 41/1497* (2013.01); *F02D 13/06* (2013.01); *F02D 29/02* (2013.01); *F02D 2041/001* (2013.01); *F02D 2041/0017* (2013.01); *F02D 2200/602* (2013.01); *F02D 2250/18* (2013.01); *F02M 25/0707* (2013.01); *Y02T 10/144* (2013.01); *Y02T 10/18* (2013.01); *Y02T 10/42* (2013.01)

(58) Field of Classification Search
CPC ................... F02D 2200/101; F02D 2200/602; F02D 2200/10; F02D 2200/1002–2200/1006; F02D 2250/18; F02D 2250/21; F02D 41/06; F02D 41/062; F02D 41/064; F16H 2061/145
USPC ............. 73/114.15, 114.25, 115.04; 123/347, 123/406.23–406.25, 406.5–406.51; 701/101–105, 110, 67, 68; 477/176
See application file for complete search history.

(56) References Cited

U.S. PATENT DOCUMENTS

| | | | | |
|---|---|---|---|---|
| 5,121,820 | A * | 6/1992 | Brown et al. ................... | 192/3.3 |
| 5,630,773 | A * | 5/1997 | Slicker .................. | F16D 48/066 477/175 |
| 6,033,342 | A * | 3/2000 | Steinel et al. ................. | 477/181 |

(Continued)

*Primary Examiner* — Lindsay Low
*Assistant Examiner* — Robert Werner

(57) ABSTRACT

A driver request module determines a driver torque request based on an accelerator pedal position, a first difference between a target engine speed and a transmission input speed, and a second difference between the transmission input speed and a measured engine speed. A request generating module generates first and second torque requests based on the driver torque request. An engine speed control module generates third and fourth torque requests based on a target engine speed and the first and second differences. Based on a mode signal: a first selection module sets a fifth torque request to one of the first and third torque requests; and a second selection module sets a sixth torque request to one of the second and fourth torque requests. An adjusting module selectively adjusts an engine operating parameter based on at least one of the fifth and sixth torque requests.

20 Claims, 6 Drawing Sheets

(51) Int. Cl.
*F02D 13/06* (2006.01)
*F02D 29/02* (2006.01)

(56) References Cited

U.S. PATENT DOCUMENTS

| | | | |
|---|---|---|---|
| 6,561,948 B2* | 5/2003 | Markyvech et al. | 477/77 |
| 7,044,888 B2* | 5/2006 | Lee | F16D 48/08 |
| | | | 477/167 |
| 7,072,762 B2* | 7/2006 | Minami et al. | 701/123 |
| 7,171,867 B2* | 2/2007 | McCrary et al. | 74/331 |
| 7,628,728 B2* | 12/2009 | Soliman et al. | 477/5 |
| 7,630,811 B2* | 12/2009 | Jiang | 701/54 |
| 7,749,132 B2* | 7/2010 | Motosugi | B60K 6/48 |
| | | | 477/176 |
| 8,027,780 B2* | 9/2011 | Whitney | F02D 11/105 |
| | | | 123/436 |
| 8,540,606 B2* | 9/2013 | Livshiz et al. | 477/181 |

* cited by examiner

ENGINE CONTROL SYSTEMS AND METHODS FOR VEHICLE LAUNCH

CROSS-REFERENCE TO RELATED APPLICATIONS

This application claims the benefit of U.S. Provisional Application No. 61/702,398, filed on Sep. 18, 2012. The disclosure of the above application is incorporated herein by reference in its entirety.

FIELD

The present disclosure relates to internal combustion engines and more specifically to engine control systems and methods for vehicle launch.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A driver request module determines a driver torque request for an engine based on an accelerator pedal position, a first difference between a target engine speed and a transmission input speed, and a second difference between the transmission input speed and a measured engine speed. A request generating module generates first and second torque requests for the engine based on the driver torque request. An engine speed control module generates third and fourth torque requests for the engine based on a target engine speed, the first difference, and the second difference. Based on a mode signal, a first selection module sets a fifth torque request equal to one of the first torque request and the third torque request. Based on the mode signal, a second selection module sets a sixth torque request equal to one of the second torque request and the fourth torque request. An adjusting module selectively adjusts at least one engine operating parameter based on at least one of the fifth and sixth torque requests.

In other features, an engine control method for a vehicle, includes: determining a driver torque request for an engine based on an accelerator pedal position, a first difference between a target engine speed and a transmission input speed, and a second difference between the transmission input speed and a measured engine speed; generating first and second torque requests for the engine based on the driver torque request; and generating third and fourth torque requests for the engine based on a target engine speed, the first difference, and the second difference. The engine control method further includes, based on a mode signal: setting a fifth torque request equal to one of the first torque request and the third torque request; and setting a sixth torque request equal to one of the second torque request and the fourth torque request. The engine control method further includes selectively adjusting at least one engine operating parameter based on at least one of the fifth and sixth torque requests.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine control module (ECM) controls actuators of an engine based on target values, respectively, to produce a target engine torque output. For example, the ECM controls spark timing based on a target spark timing (for a gasoline engine), fuel injection based on target fueling parameters, intake and exhaust cam phasers based on target intake and exhaust cam phaser angles, a throttle valve based on a target opening, and a wastegate of a turbocharger based on a target wastegate duty cycle.

The ECM determines the target values based on torque requests. The ECM generally generates the torque requests based on a position of an accelerator pedal and/or one or more other parameters. While the engine is idling, the ECM generates the torque requests based on a target engine speed, such as a predetermined idle engine speed.

A vehicle launch event may refer to a period of vehicle acceleration beginning from a vehicle speed of zero. During a vehicle launch event of a vehicle with a manual transmission, the ECM may increase the target engine speed in response to actuation of a clutch pedal to increase the torque requests and facilitate vehicle acceleration. However, increasing the target engine speed in response to clutch pedal actuation may cause a flare in the engine speed when the transmission is in neutral.

The ECM of the present disclosure therefore determines the torque requests for vehicle launch based on a difference between the engine speed and the target engine speed and based on a difference between a target slip value and a measured slip value. Slip refers to a difference between the engine speed and a transmission input speed. Determining the torque requests for vehicle launch based on the differences minimizes engine speed decreases during vehicle launch, reduces shudder experienced during vehicle launch, decreases unnecessary energy input to a clutch, and increases clutch durability.

Figure 1:
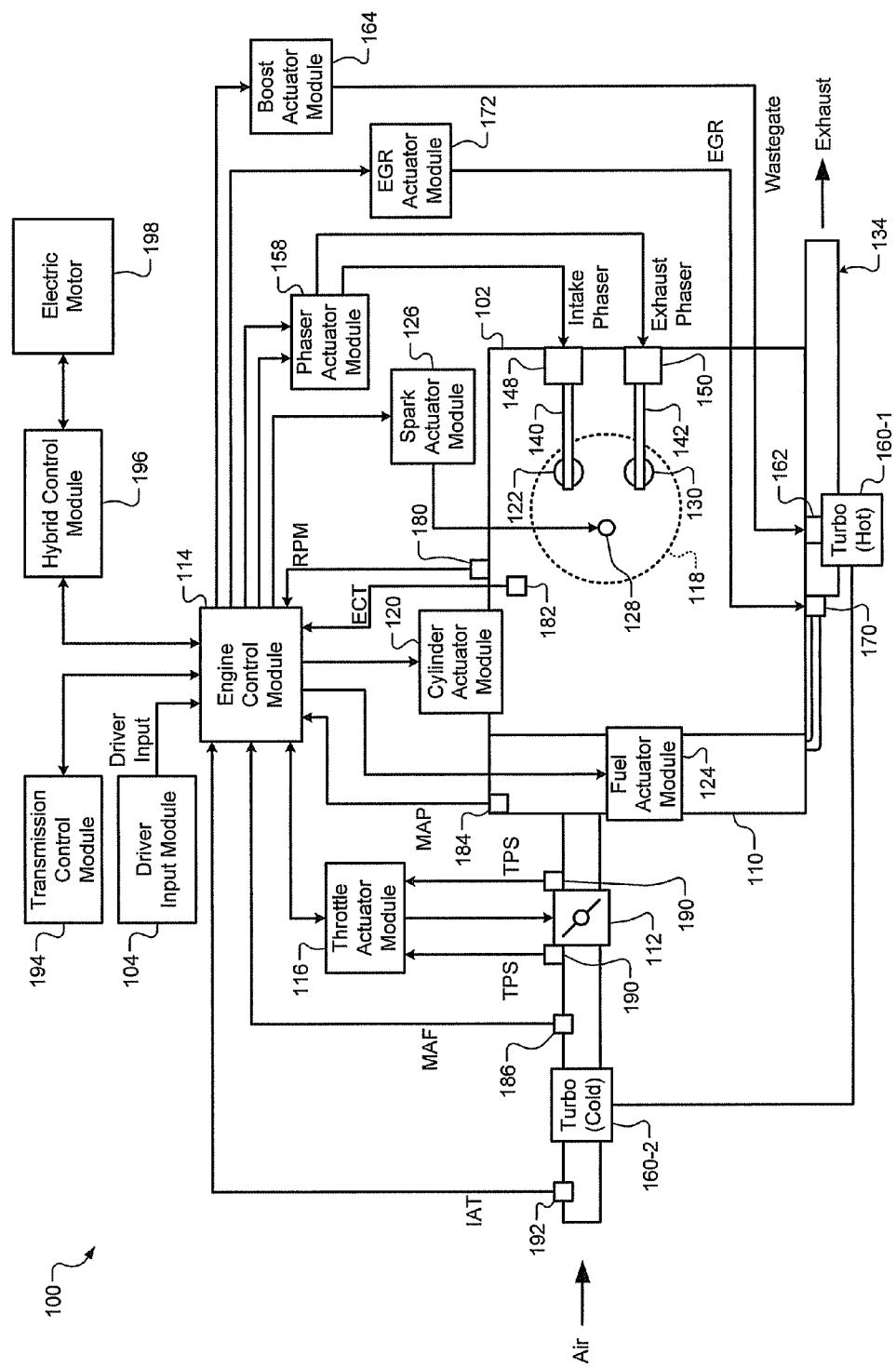
FIG. 1 is a functional block diagram of an example engine system according to the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. While not shown, the engine 102 may be a compression-ignition engine, in which case compression within the cylinder 118 ignites the air/fuel mixture. Alternatively, as shown, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. The spark actuator module 126 may halt provision of spark to deactivated cylinders. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as camless valve actuators.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. The ECM 114 may control the turbocharger via a boost actuator module 164. The boost actuator module 164 may modulate the boost of the turbocharger by controlling opening of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure a rotational speed of the crankshaft in revolutions per minute (RPM) using an RPM sensor 180. More specifically, crankshaft position may be monitored by the RPM sensor 180, and engine speed may be determined based on the position of the crankshaft. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The engine system 100 may also include one or more other sensors. The ECM 114 may use signals from the sensors to make control decisions for the engine system 100.

The vehicle also includes a transmission, which may be a manual transmission or a dual clutch transmission (DCT). A transmission control module 194 may control one or more components of the transmission. The ECM 114 and the transmission control module 194 may communicate. For example, the ECM 114 may reduce engine torque during a gear shift.

The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. While only the electric motor 198 is shown, zero or more than one electric motor may be implemented. In various implementations, various functions of the ECM 114, the transmission control module 194, and the hybrid control module 196 may be integrated into one or more modules.

Each system that varies an engine parameter may be referred to as an actuator. Each system receives a target actuator value. For example, the throttle actuator module 116 may be referred to as an actuator, and a target throttle opening area may be referred to as the target actuator value. In the example of FIG. 1, the throttle actuator module 116 achieves the target throttle opening area by adjusting an angle of the blade of the throttle valve 112.

Similarly, the spark actuator module 126 may be referred to as an actuator, while the corresponding target actuator value may be a target spark timing relative to piston TDC. Other actuators may include the cylinder actuator module 120, the fuel actuator module 124, the phaser actuator module 158, the boost actuator module 164, and the EGR actuator module 172. For these actuators, the target actuator values may include target number of activated cylinders, target fueling parameters, target intake and exhaust cam phaser angles, target wastegate duty cycle, and target EGR valve opening area, respectively. The ECM 114 may generate the target actuator values to cause the engine 102 to generate a target engine output torque.

Figure 2:
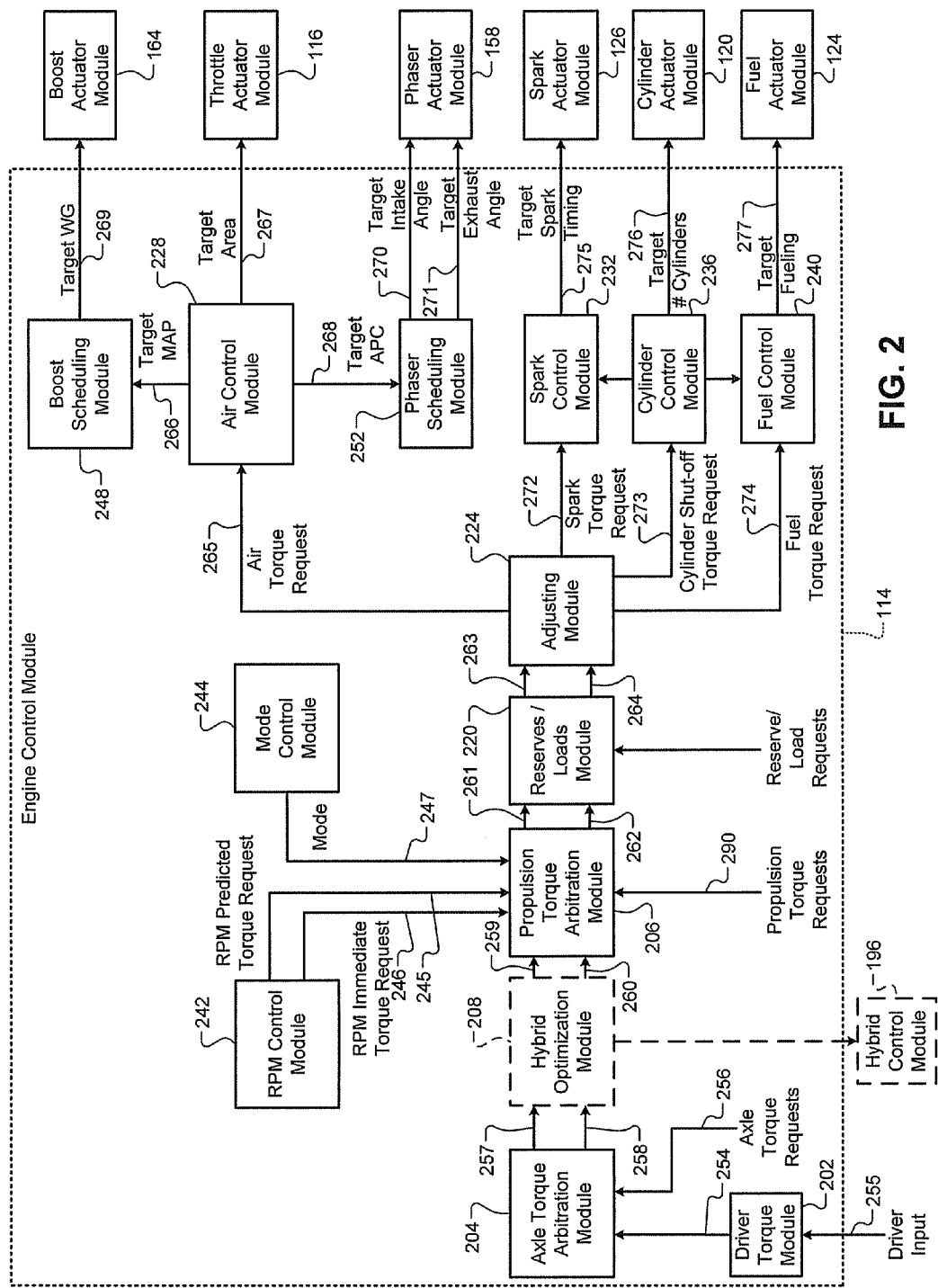
FIG. 2 is a functional block diagram of an example engine control system according to the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, an adjusting module 224, an air control module 228, a spark control module 232, a cylinder control module 236, and a fuel control module 240. The ECM 114 also includes an RPM control module 242, a mode control module 244, a boost scheduling module 248, and a phaser scheduling module 252.

The driver torque module 202 may determine a driver torque request 254 based on a driver input 255 from the driver input module 104. The driver input 255 may be based on, for example, a position of an accelerator pedal, a position of a brake pedal, and a position of a clutch pedal. The driver input 255 may also include cruise control input, which may be an adaptive cruise control system that varies vehicle speed to maintain a predetermined following distance. The driver torque module 202 is discussed further below in conjunction with FIG. 3.

An axle torque arbitration module 204 arbitrates between the driver torque request 254 and other axle torque requests 256. Axle torque (torque at the wheels) may be produced by various sources including an engine and/or one or more electric motors. For example, the axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted (axle) torque request 257 and an immediate (axle) torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the actuators of the engine system 100.

In general terms, the immediate torque request 258 is the amount of currently target axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the target actuator values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on a slippery surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. As described in more detail below, fast engine actuators are defined in contrast with slow engine actuators.

In various implementations, fast engine actuators are capable of varying axle torque within a range, where the range is established by the slow engine actuators. The upper limit of the range is the predicted torque request 257, while the lower limit of the range is limited by the torque (varying) capacity of the fast actuators. For example only, fast actuators may only be able to reduce axle torque by a first amount, where the first amount is a measure of the torque capacity of the fast actuators. The first amount may vary based on engine operating conditions set by the slow engine actuators.

When the immediate torque request 258 is within the range, fast engine actuators can be controlled to cause the axle torque to be equal to the immediate torque request 258. When the ECM 114 requests the predicted torque request 257 to be output, the fast engine actuators can be controlled to vary the axle torque to the top of the range, which is the predicted torque request 257.

In general terms, fast engine actuators can change the axle torque more quickly than slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request 257 if the fast actuators were set to appropriate values. Meanwhile, the ECM 114 may set target actuator values for fast actuators to values that, given the slow actuator values, cause the engine system 100 to produce the immediate torque request 258 instead of the predicted torque request 257.

The fast actuators therefore cause the engine system 100 to produce the immediate torque request 258. When the ECM 114 decides to transition the axle torque from the immediate torque request 258 to the predicted torque request 257, the ECM 114 changes the target actuator values for one or more fast actuators to values that correspond to the predicted torque request 257. Because the target actuator values for the slow actuators have already been set based on the predicted torque request 257, the engine system 100 is able to produce the predicted torque request 257 after only the (minimal) delay imposed by the fast actuators. In other words, the longer delay that would otherwise result from changing axle torque using slow actuators is avoided.

For example only, in a spark-ignition engine, spark timing may be a fast actuator value, while throttle opening area may be a slow actuator value. Spark-ignition engines may combust fuels including, for example, gasoline and ethanol, by applying a spark. By way of contrast, in a compression-ignition engine, fuel flow may be a fast actuator value, while throttle opening may be used as an actuator value for engine characteristics other than torque. Compression-ignition engines may combust fuels including, for example, diesel fuel, via compression.

When the engine 102 is a spark-ignition engine, the spark actuator module 126 may be a fast actuator and the throttle actuator module 116 may be a slow actuator. After receiving a new target actuator value, the spark actuator module 126 may be able to change spark timing for the following firing event. When the spark timing (also called spark advance) for a firing event is set to an optimum value, a maximum amount of torque may be produced in the combustion stroke immediately following the firing event. However, a spark timing deviating from the optimum value may reduce the amount of torque produced in the combustion stroke. Therefore, the spark actuator module 126 may be able to vary engine output torque as soon as the next firing event by varying spark timing. For example only, a table of optimum spark timings corresponding to different engine operating conditions may be determined during a calibration phase of vehicle design, and the optimum value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new target actuator value. In addition, air flow changes based on the throttle opening area are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing (for gasoline engines) and/or fueling (for diesel engines) can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258. The immediate torque request 258 is set low (e.g., close to zero) before any load is imposed on the engine 102 and is increased as the load comes on to maintain engine speed at a target engine speed.

The axle torque arbitration module 204 may output the predicted torque request 257 and the immediate torque request 258 to a propulsion torque arbitration module 206 in non-hybrid vehicles. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 (see also FIG. 5) arbitrates between propulsion torque requests 290, including the converted predicted and immediate torque requests. The propulsion torque arbitration module 206 generates predicted and immediate torque request for operation in a torque mode. The predicted and immediate torque requests for the torque mode will be referred to as a torque mode predicted torque request and a torque mode immediate torque request.

The torque mode torque requests may be generated by adjusting the converted predicted and immediate torque requests based on one or more of the other received requests. Alternatively or additionally, the torque mode torque requests may be generated by modifying one of the received requests based on another one or more of the received torque requests. For example, the propulsion torque requests 290 may include torque reductions for engine over-speed protection, torque increases for stall prevention, and torque reductions requested by the transmission control module 194 to accommodate gear shifts. The propulsion torque requests 290 may also result from clutch fuel cutoff, which reduces the engine output torque when the driver depresses the clutch pedal in a manual transmission vehicle to prevent a flare (rapid rise) in engine speed while the vehicle is in motion.

The propulsion torque requests 290 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The RPM control module 242 generates predicted and immediate torque requests for operation in an engine speed (RPM) mode. The predicted and immediate torque requests for the RPM mode will be referred to as a RPM mode predicted torque request 245 (e.q., a third torque request) and a RPM mode immediate torque request 246 (e.g., a fourth torque request). The RPM control module 242 is discussed further below in conjunction with FIG. 4.

The mode control module 244 sets a mode signal 247 to one of the RPM mode (e.q., a second state) and the torque mode (e.q., a first state) at a given time. The mode control module 244 may set the mode signal 247, for example, based on the predicted torque request 257, the driver torque request 254, or the torque mode predicted torque request. For example only, when the torque request is less than a predetermined torque value, the mode control module 244 may set the mode signal 247 to the RPM mode. When the torque request is greater than the predetermined torque value, the mode control module 244 may set the mode signal 247 to the torque mode. In this manner, the mode signal 247 may be set to the RPM mode when the accelerator pedal is in a resting (zero) position and set to the torque mode when the accelerator pedal is depressed from the resting position.

Based on the mode signal 247, the propulsion torque arbitration module 206 selects: the torque mode predicted and immediate torque requests; or the RPM mode predicted and immediate torque requests. The propulsion torque arbitration module 206 generates predicted and immediate propulsion torque requests 261 and 262 based on the selected one of the pairs of torque requests. The propulsion torque arbitration module 206 is discussed further below in conjunction with FIG. 5.

The reserves/loads module 220 receives the predicted and immediate propulsion torque requests 261 and 262. The reserves/loads module 220 may adjust the predicted and immediate propulsion torque requests 261 and 262 to create a torque reserve and/or to compensate for one or more loads. The reserves/loads module 220 then outputs adjusted predicted and immediate torque requests 263 and 264 to the adjusting module 224.

For example only, a catalyst light-off process or a cold start emissions reduction process may require retarded spark timing. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The adjusting module 224 receives the adjusted predicted and immediate torque requests 263 and 264. The adjusting module 224 determines how the adjusted predicted and immediate torque requests 263 and 264 will be achieved. The adjusting module 224 may be engine type specific. For example, the adjusting module 224 may be implemented differently or use different control schemes for spark-ignition engines versus compression-ignition engines.

In various implementations, the adjusting module 224 may define a boundary between modules that are common across all engine types and modules that are engine type specific. For example, engine types may include spark-ignition and compression-ignition. Modules prior to the adjusting module 224, such as the propulsion torque arbitration module 206, may be common across engine types, while the adjusting module 224 and subsequent modules may be engine type specific.

For example, in a spark-ignition engine, the adjusting module 224 may vary the opening of the throttle valve 112 as a slow actuator that allows for a wide range of torque control. The adjusting module 224 may disable cylinders using the cylinder actuator module 120, which also provides for a wide range of torque control, but may also be slow and may involve drivability and emissions concerns. The adjusting module 224 may use spark timing as a fast actuator. However, spark timing may not provide as much range of torque control. In addition, the amount of torque control possible with changes in spark timing (referred to as spark reserve capacity) may vary as air flow changes.

In various implementations, the adjusting module 224 may generate an air torque request 265 based on the adjusted predicted torque request 263. The air torque request 265 may be equal to the adjusted predicted torque request 263, setting air flow so that the adjusted predicted torque request 263 can be achieved by changes to other (e.g., fast) actuators.

Target actuator values for airflow controlling actuators may be determined based on the air torque request 265. For example only, the air control module 228 may determine a target manifold absolute pressure (MAP) 266, a target throttle opening (e.g., area) 267, and/or a target air per cylinder (APC) 268 based on the air torque request 265.

The throttle actuator module 116 regulates the throttle valve 112 to produce the target opening 267. The boost scheduling module 248 controls the wastegate 162 based on the target MAP 266. For example, the boost scheduling module 248 may determine a target duty cycle 269 for the wastegate 162 based on the target MAP 266, and the boost actuator module 164 may control the wastegate 162 based on the target duty cycle 269. The phaser scheduling module 252 may determine target intake and exhaust cam phaser angles 270 and 271 based on the target APC 268, and the phaser actuator module 158 may control the intake and exhaust cam phasers 148 and 150 based on the target intake and exhaust cam phaser angles 270 and 271. In various implementations, the air control module 228 may also determine a target opening of the EGR valve 170 based on the air torque request 265.

The adjusting module 224 may also generate a spark torque request 272, a cylinder shut-off torque request 273, and a fuel torque request 274. The spark control module 232 may determine how much to retard the spark timing (which reduces engine output torque) from an optimum spark timing based on the spark torque request 272. For example only, a torque relationship may be inverted to solve for a target spark timing 275.

The cylinder shut-off torque request 273 may be used by the cylinder control module 236 to determine a target number 276 of cylinders to deactivate. The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 274. More specifically, the fuel control module 240 may generate target fueling parameters 277 based on the fuel torque request 274. The target fueling parameters 277 may include, for example, target mass of fuel, target injection starting timing, and target number of fuel injections.

During normal operation of a spark-ignition engine, the fuel control module 240 may operate in an air lead mode in which the fuel control module 240 attempts to maintain a stoichiometric air/fuel ratio by controlling fueling based on air flow. The fuel control module 240 may determine a target fuel mass that will yield stoichiometric combustion when combined with a present mass of air per cylinder (APC).

In compression-ignition systems, the fuel control module 240 may operate in a fuel lead mode in which the fuel control module 240 determines a target fuel mass for each cylinder that satisfies the fuel torque request 274 while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent smoke production in dynamic engine operating conditions.

Figure 3:
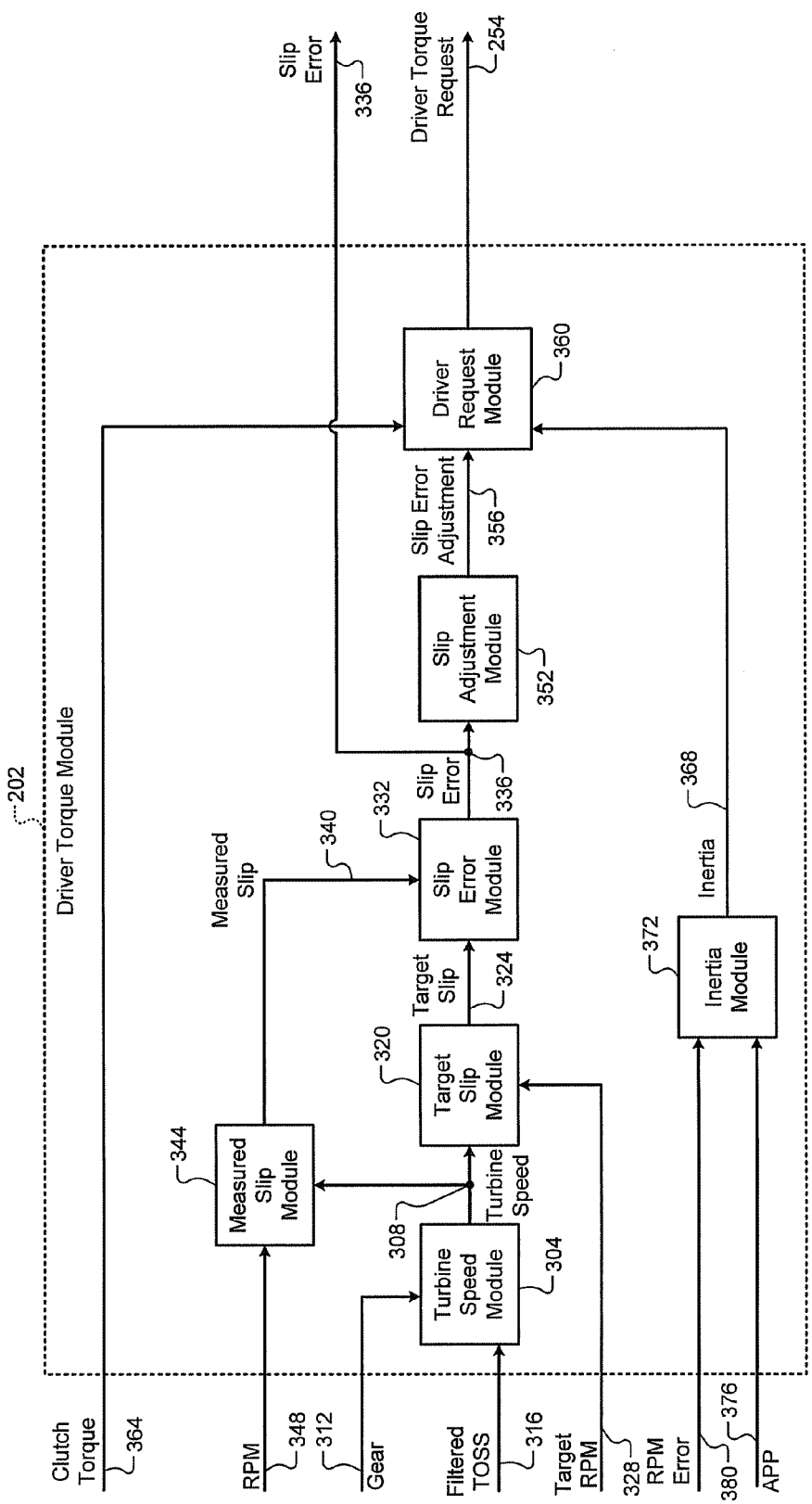
FIG. 3 is a functional block diagram of an example implementation of a driver torque module according to the present disclosure.

Referring now to FIG. 3, a functional block diagram of an example implementation of the driver torque module 202 is presented. A turbine speed module 304 determines a turbine speed 308 based on a gear ratio 312 and a filtered transmission output shaft speed (TOSS) 316. For example, the turbine speed module 304 may determine the turbine speed 308 based on a product of the gear ratio 312 and the filtered TOSS 316. The turbine speed 308 corresponds to a rotational speed of a transmission input shaft. The gear ratio 312 corresponds to the current drive ratio and may be provided by the transmission control module 194. The filtered TOSS 316 corresponds to a filtered version of a measured rotational speed of a transmission output shaft and may be provided by the transmission control module 194.

A target slip module 320 determines a target slip value 324 (e.g., a first difference) based on a difference between the turbine speed 308 and a target RPM 328. Slip refers to a difference between engine speed (crankshaft speed) and transmission input shaft speed. The target slip value 324 corresponds to a target value for slip at a given time. The target RPM 328 may be provided by the RPM control module 242, as discussed further below.

A slip error module 332 determines a slip error 336 (e.g., a third difference) based on a difference between the target slip value 324 and a measured slip value 340 (e.g., a second difference). The measured slip value 340 corresponds to the current amount of slip. A measured slip module 344 determines the measured slip 340 based on a difference between an engine speed (RPM) 348 and the turbine speed 308. The RPM 348 may be generated based on the output of the RPM sensor 180.

A slip adjustment module 352 determines a slip error torque adjustment 356 based on the slip error 336. The slip adjustment module 352 may determine the slip error torque adjustment 356 based on the slip error 336, for example, using proportional integral (PI) control. The proportional (P) term may be determined based on a product of the slip error 336 and a proportional constant, and the integral (I) term may be determined based on a product of the slip error 336 and an integral constant summed over a duration of a vehicle launch event. The integral term includes two components: an integral delay time (during which the integral term is inactive); and an integral rise (an increase in the integral term). The integral rise is delayed (during the integral delay time) until the turbine speed 308 begins to increase (or the measured slip 308 begins to decrease). The integral (rise) term may be limited to a predetermined maximum value that is a function of an accelerator pedal position (APP) 376. In various implementations, the integral (rise) term may be set using the equation:

$$I = \left(\frac{Tm}{Ndo}\right) * (Ndo - Nd) = Tm - Tm * \left(\frac{Nd}{Ndo}\right),$$

where I is the integral term, Tm is the predetermined maximum value, and Nd is a feedforward slip value determined based on the target slip value 324, and Ndo is the feedforward slip value at the start of the vehicle launch event. The feedforward slip value may be set based on or equal to a previous value of the target slip 324*k, where k is a predetermined value, such as approximately 0.99. A vehicle launch event refers to a period of vehicle acceleration beginning from a vehicle speed of zero. While PI control has been discussed, proportional (P) control, proportional integral derivative (PID) control, or another suitable type of feedback control may be used.

A driver request module 360 generates the driver torque request 254. During a vehicle launch event, the driver request module 360 may generate the driver torque request 254 based on the slip error torque adjustment 356, a clutch torque 364, and an inertia term 368. The driver request module 360 may determine the driver torque request 254, for example, using one or more functions and/or mappings that relate the slip error torque adjustment 356, the clutch torque 364, and the inertia term 368 to the driver torque request 254. For example only, the driver request module 360 may set the driver torque request 254 based on a sum of the slip error torque adjustment 356, the clutch torque 364, and the inertia term 368. The clutch torque 364 refers to a current amount of torque on a torque transfer device (e.g., a clutch) that is currently involved in transferring torque from the engine 102 to the transmission and may be provided by the transmission control module 194. For manual transmission vehicles, the clutch torque 364 may be zero during vehicle launch events.

An inertia module 372 determines the inertia term 368 based on the APP 376 and an engine speed (RPM) error 380. The inertia module 372 may determine the inertia term 368, for example, using one or more functions and/or mappings that relate the RPM error 380 and the APP 376 to the inertia term 368. The APP 376 may be measured using an APP sensor. The RPM error 380 is determined based on a difference between the RPM 348 and the target RPM 328, as discussed further below.

Figure 4:
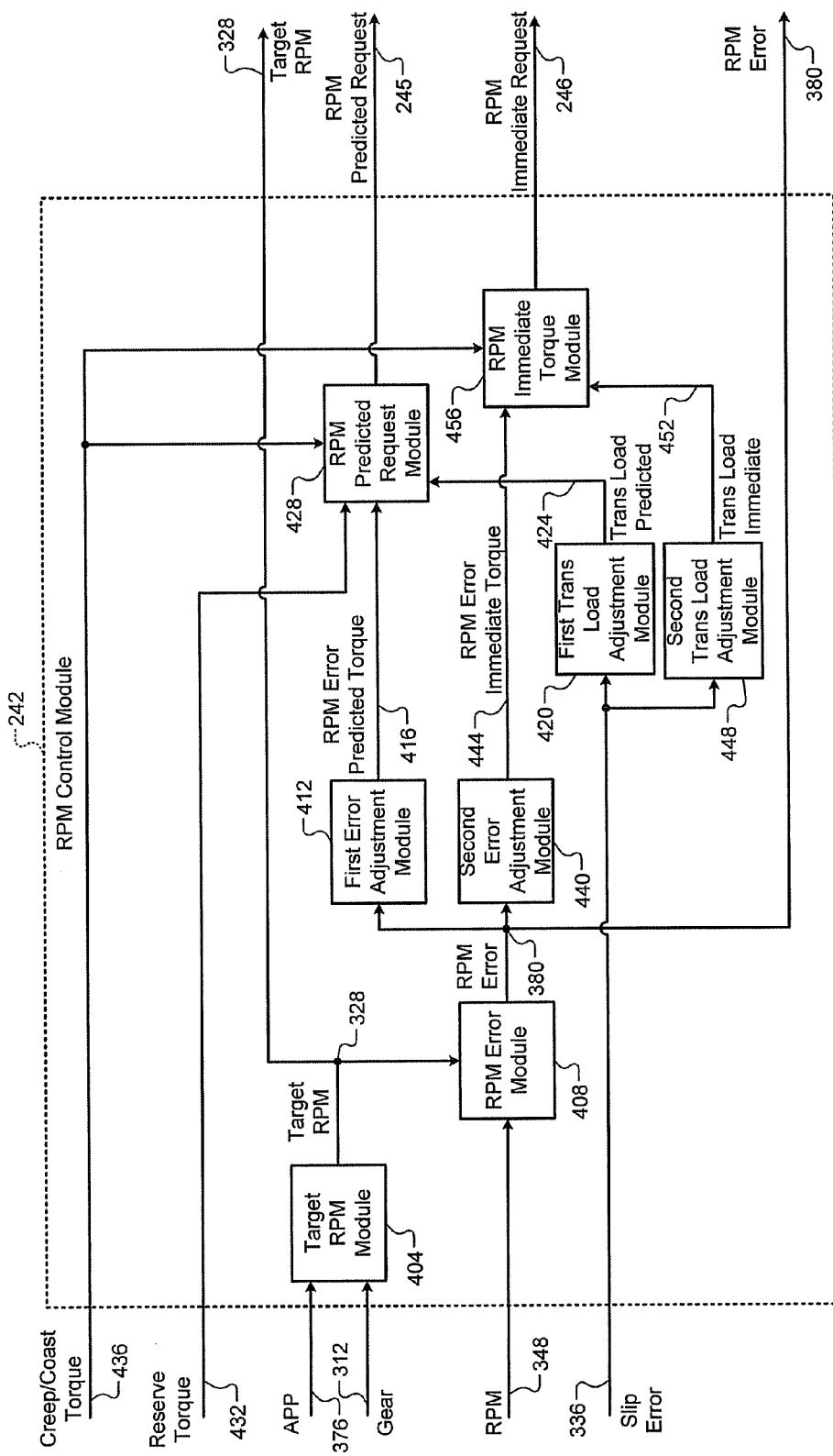
FIG. 4 is a functional block diagram of example of an engine speed control module according to the present disclosure.

Referring now to FIG. 4, a functional block diagram of an example implementation of the RPM control module 242 is presented. A target RPM module 404 determines the target RPM 328 based on the APP 376 and the gear ratio 312. The target RPM module 404 may determine the target RPM 328, for example, using one or more functions and/or mappings that relate the APP 376 and the gear ratio 312 to the target RPM 328. An RPM error module 408 determines the RPM error 380 based on a difference between the target RPM 328 and the RPM 348.

A first error adjustment module 412 determines an RPM error predicted torque 416 based on the RPM error 380. The first error adjustment module 412 may determine the RPM error predicted torque 416 based on the RPM error 380, for example, using PI control. The proportional (P) term may be determined based on a product of the RPM error 380 and a proportional constant, and the integral (I) term may be determined based on a product of the RPM error 380 and an integral constant. While PI control has been discussed, proportional (P) control, proportional integral derivative (PID) control, or another suitable type of feedback control may be used.

A first transmission load adjustment module 420 generates a transmission load predicted torque 424 based on the slip error 336. The first transmission load adjustment module 420 may determine the transmission load predicted torque 424 based on the slip error 336, for example, using PI control. The proportional (P) term may be determined based on a product of the slip error 336 and a proportional constant, and the integral (I) term may be determined based on a product of the slip error 336 and an integral constant. The integral constant may be determined as a function of the turbine speed 308, and the integral term may be limited to a predetermined maximum value. While PI control has been discussed, proportional (P) control, proportional integral derivative (PID) control, or another suitable type of feedback control may be used.

An RPM predicted request module 428 determines the RPM mode predicted torque request 245 based on the RPM error predicted torque 416, the transmission load predicted torque 424, an RPM mode reserve torque 432, and a creep/coast torque 436. The RPM predicted request module 428 may determine the RPM mode predicted torque request 245, for example, using one or more functions and/or mappings that relate the RPM error predicted torque 416, the transmission load predicted torque 424, the RPM mode reserve torque 432, and the creep/coast torque 436 to the RPM mode predicted torque request 245. For example, the RPM predicted request module 428 may set the RPM mode predicted torque request 245 based on a sum of the RPM error predicted torque 416, the transmission load predicted torque 424, the RPM mode reserve torque 432, and the creep/coast torque 436. The RPM mode reserve torque 432 may be a predetermined value and correspond to a torque reserve to prevent the engine 102 from stalling while the engine 102 idles. The creep/coast torque 436 may be set to zero during vehicle launch events and may correspond to an amount of torque needed to coast down to idle.

A second error adjustment module 440 determines an RPM error immediate torque 444 based on the RPM error 380. The second error adjustment module 440 may determine the RPM error immediate torque 444 based on the RPM error 380, for example, using PI control. The proportional (P) term may be determined based on a product of the RPM error 380 and a proportional constant, and the integral (I) term may be determined based on a product of the RPM error 380 and an integral constant. While PI control has been discussed, proportional (P) control, proportional integral derivative (PID) control, or another suitable type of feedback control may be used.

A second transmission load adjustment module 448 generates a transmission load immediate torque 452 based on the slip error 336. The second transmission load adjustment module 448 may determine the transmission load immediate torque 452 based on the slip error 336, for example, using PI control. The proportional (P) term may be determined based on a product of the slip error 336 and a proportional constant, and the integral (I) term may be determined based on a product of the slip error 336 and an integral constant. The integral constant may be determined as a function of the turbine speed 308, and the integral term may be limited to a predetermined maximum value. While PI control has been discussed, proportional (P) control, proportional integral derivative (PID) control, or another suitable type of feedback control may be used.

An RPM immediate request module 456 determines the RPM mode immediate torque request 246 based on the RPM error immediate torque 444, the transmission load immediate torque 452, and the creep/coast torque 436. The RPM immediate request module 456 may determine the RPM mode immediate torque request 246, for example, using one or more functions and/or mappings that relate the RPM error immediate torque 444, the transmission load immediate torque 452, and the creep/coast torque 436 to the RPM mode immediate torque request 246. For example, the RPM immediate request module 456 may set the RPM mode immediate torque request 246 based on a sum of the RPM error immediate torque 444, the transmission load immediate torque 452, and the creep/coast torque 436.

Figure 5:
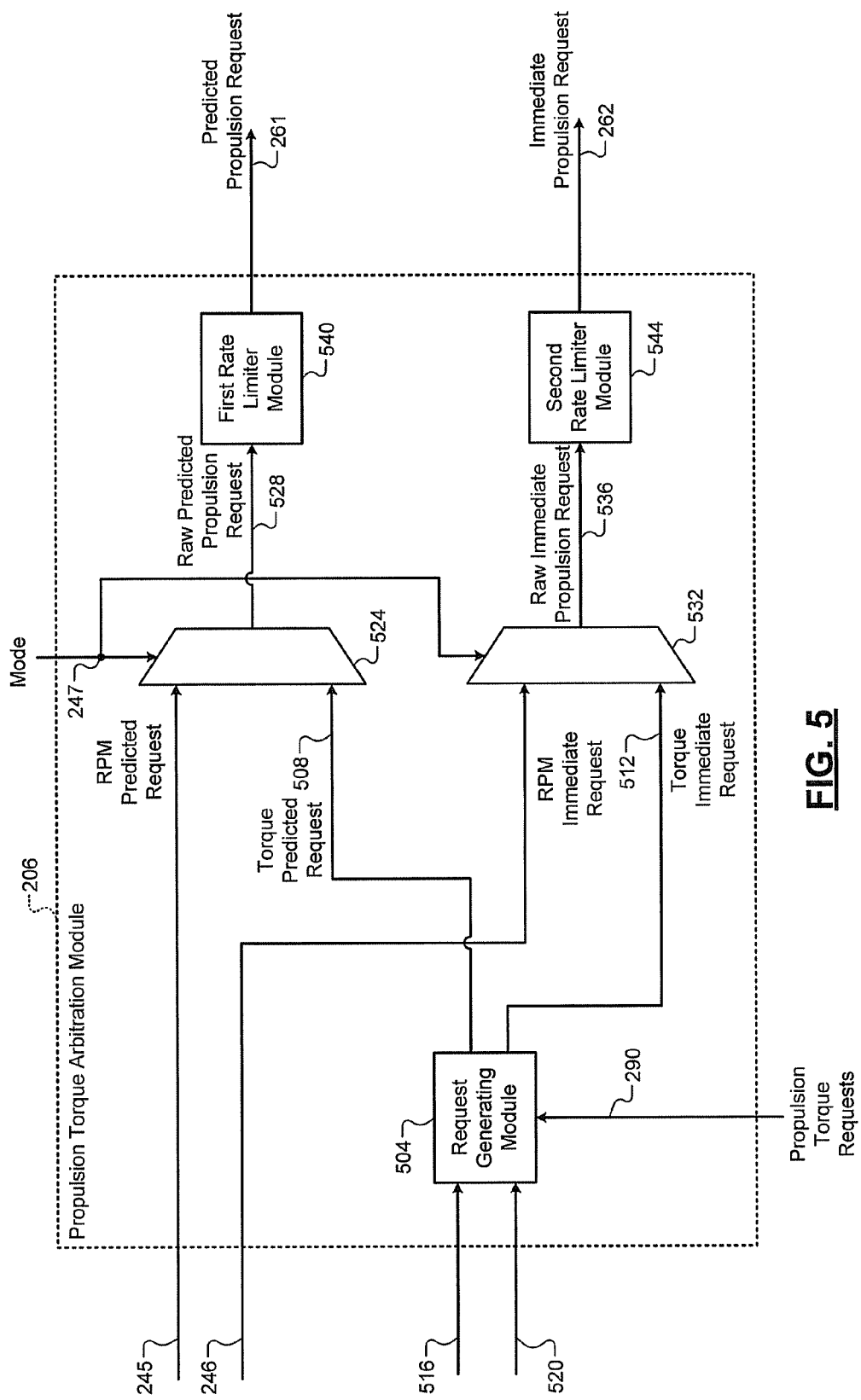
FIG. 5 is a functional block diagram of an example implementation of a propulsion torque arbitration module according to the present disclosure.

Referring now to FIG. 5, a functional block diagram of an example implementation of the propulsion torque arbitration module 206 is presented. A request generating module 504 generates the torque mode predicted and immediate torque requests 508 and 512 (e.g., first and second torque requests, respectively) based on the results of the arbitration of the propulsion torque requests 290 and the converted predicted and immediate torque requests 516 and 520. The torque mode predicted and immediate torque requests 508 and 512 are generated based on the driver torque request 254, as described above.

A first selection module 524 receives the RPM mode predicted torque request 245 and the torque mode predicted torque request 508. The first selection module 524 selects one of the RPM mode predicted torque request 245 and the torque mode predicted torque request 508 and outputs the selected one of the torque requests as a raw predicted propulsion torque request 528 (e.g., a fifth torque request).

The first selection module 524 selects one of the torque requests at a given time based on the mode signal 247. When the mode signal 247 is set to the RPM mode, the first selection module 524 selects the RPM mode predicted torque request 245. When the mode signal 247 is set to the torque mode, the first selection module 524 selects the torque mode predicted torque request 508. In this manner, the torque mode predicted torque request 508 will be selected and used during vehicle launch events with accelerator pedal depression, and the RPM mode predicted torque request 245 will be used during vehicle launch events with zero accelerator pedal depression.

A second selection module 532 receives the RPM mode immediate torque request 246 and the torque mode immediate torque request 512. The second selection module 532 selects one of the RPM mode immediate torque request 246 and the torque mode immediate torque request 512 and outputs the selected one of the torque requests as a raw immediate propulsion torque request 536 (e.g., a sixth torque request).

The second selection module 532 selects one of the torque requests at a given time based on the mode signal 247. When the mode signal 247 is set to the RPM mode, the second selection module 532 selects the RPM mode immediate torque request 246. When the mode signal 247 is set to the torque mode, the second selection module 532 selects the torque mode immediate torque request 512. In this manner, the torque mode immediate torque request 512 will be selected and used during vehicle launch events with accelerator pedal depression, and the RPM mode immediate torque request 246 will be used during vehicle launch events with zero accelerator pedal depression.

A first rate limiter module 540 applies a first rate limit to the raw predicted propulsion torque request 528 and outputs the predicted propulsion torque request 261. In other words, the first rate limiter module 540 adjusts the predicted propulsion torque request 261 toward the raw predicted propulsion torque request 528 by up to the first maximum amount each predetermined period. The first rate limit corresponds to a first maximum amount of adjustment per predetermined period.

A second rate limiter module 544 applies a second rate limit to the raw immediate propulsion torque request 536 and outputs the immediate propulsion torque request 262. In other words, the second rate limiter module 544 adjusts the immediate propulsion torque request 262 toward the raw immediate propulsion torque request 536 by up to the second amount per predetermined period. The second rate limit corresponds to a second maximum amount of adjustment per predetermined period.

Figure 6:
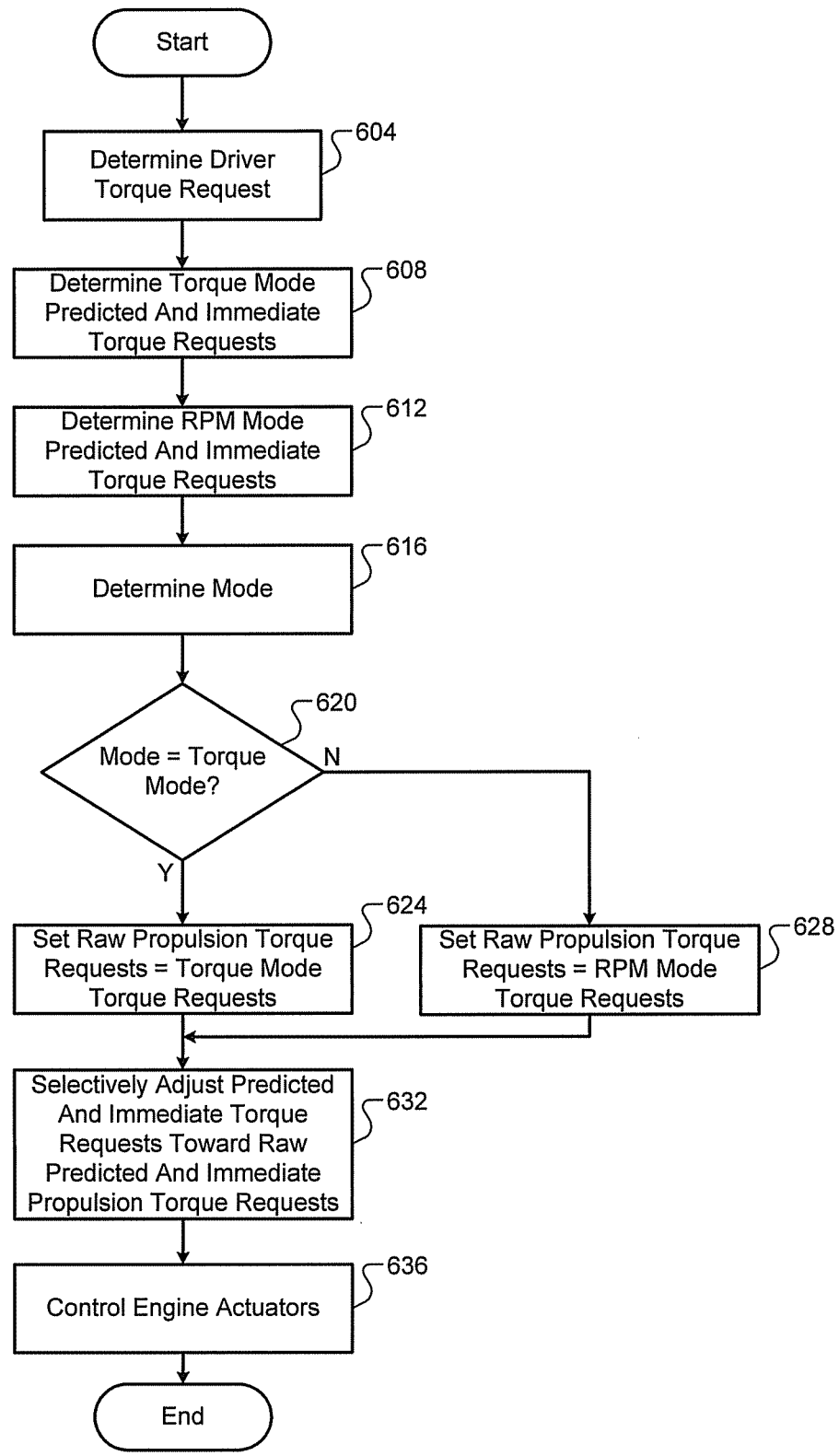
FIG. 6 is a flowchart depicting an example method of generating propulsion torque requests according to the present disclosure.

Referring now to FIG. 6, a flowchart depicting an example method of generating the predicted and immediate propulsion torque requests 261 and 262 and controlling the engine actuators is presented. Control begins with 604 where the driver torque module 202 determines the driver torque request 254. The driver torque module 202 determines the driver torque request 254 as described above in conjunction with FIG. 3.

At 608, the propulsion torque arbitration module 206 generates the torque mode predicted and immediate torque requests 508 and 512. The propulsion torque arbitration module 206 generates the torque mode predicted and immediate torque requests 508 and 512 based on the driver torque request 254, as discussed above. At 612, the RPM control module 242 generates the RPM mode predicted and immediate torque requests 245 and 246. The RPM control module 242 generates the RPM mode predicted and immediate torque requests 245 and 246 as discussed above in conjunction with FIG. 4.

At 616, the mode control module 244 determines the mode of operation and sets the mode signal 247. The mode control module 244 sets the mode signal 247 to one of the RPM mode and the torque mode at a given time. For example, the mode control module 244 may set the mode signal 247 to the RPM mode when a torque request generated based on driver input is less than a predetermined torque value. When the torque request is greater than the predetermined torque value, the mode control module 244 may set the mode signal 247 to the torque mode.

At 620, the first and second selection modules 524 and 532 determine whether the mode signal 247 is set to the torque mode. If true, control continues with 624; if false, control transfers to 628. At 624, the first selection module 524 sets the raw predicted propulsion torque request 528 equal to the torque mode predicted torque request 508, and the second selection module 532 sets the raw immediate propulsion torque request 536 equal to the torque mode immediate torque request 512. At 628, the first selection module 524 sets the raw predicted propulsion torque request 528 equal to the RPM mode predicted torque request 245, and the second selection module 532 sets the raw immediate propulsion torque request 536 equal to the RPM mode immediate torque request 246. Control continues with 632 after 624 or 628.

The first rate limiter module 540 adjusts the predicted propulsion torque request 261 toward the raw predicted propulsion torque request 528 by up to the first maximum amount at 632. Also at 632, the second rate limiter module 544 adjusts the immediate propulsion torque request 262 toward the raw immediate propulsion torque request 536 by up to the second maximum amount. One or more engine actuators and engine operating parameters are selectively adjusted based on the predicted and immediate propulsion torque requests 261 and 262 at 636, and control ends. While control is shown and discussed as ending, FIG. 6 is illustrative of one control loop, and control may perform control loops at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. An engine control system for a vehicle, comprising:
a driver request module that determines a driver torque request for an engine based on an accelerator pedal position, a first difference between a target engine speed and a transmission input speed, and a second difference between the transmission input speed and a measured engine speed;
a request generating module that generates first and second torque requests for the engine based on the driver torque request;
an engine speed control module that generates third and fourth torque requests for the engine based on the target engine speed, the first difference, and the second difference;
a first selection module that, based on a mode signal, sets a fifth torque request equal to one of the first torque request and the third torque request;
a second selection module that, based on the mode signal, sets a sixth torque request equal to one of the second torque request and the fourth torque request; and
an adjusting module that selectively adjusts at least one engine operating parameter based on at least one of the fifth and sixth torque requests.

2. The engine control system of claim 1 wherein:
when the mode signal is in a first state, the first selection module sets the fifth torque request equal to the first torque request and the second selection module sets the sixth torque request equal to the second torque request; and
when the mode signal is in a second state, the first selection module sets the fifth torque request equal to the third torque request and the second selection module sets the sixth torque request equal to the fourth torque request.

3. The engine control system of claim 2 further comprising a mode control module that sets the mode signal to one of the first state and the second state based on the driver torque request.

4. The engine control system of claim 3 wherein the mode control module sets the mode signal to the first state when the driver torque request is greater than a predetermined torque and sets the mode signal to the second state when the driver torque request is less than the predetermined torque.

5. The engine control system of claim 1 wherein the driver request module determines the driver torque request based on the accelerator pedal position and a third difference between the first difference and second difference.

6. The engine control system of claim 5 wherein the engine speed control module generates the third and fourth torque requests as a function of the target engine speed and the third difference.

7. The engine control system of claim 1 wherein the driver request module begins increasing the driver torque request in response to an increase in the transmission input speed.

8. The engine control system of claim 1 wherein the engine speed control module determines the target engine speed based on the accelerator pedal position and a gear ratio.

9. The engine control system of claim 1 further comprising a turbine speed module that determines the transmission input speed based on a transmission output shaft speed and a gear ratio.

10. The engine control system of claim 1 wherein, based on at least one of the fifth and sixth torque requests, the adjusting module selectively adjusts at least one of opening of a throttle valve, camshaft phasing, output of a boost device, spark timing, and fueling.

11. An engine control method for a vehicle, comprising:
determining a driver torque request for an engine based on an accelerator pedal position, a first difference between a target engine speed and a transmission input speed, and a second difference between the transmission input speed and a measured engine speed;
generating first and second torque requests for the engine based on the driver torque request;

generating third and fourth torque requests for the engine based on the target engine speed, the first difference, and the second difference;
based on a mode signal:
  setting a fifth torque request equal to one of the first torque request and the third torque request; and
  setting a sixth torque request equal to one of the second torque request and the fourth torque request; and
selectively adjusting at least one engine operating parameter based on at least one of the fifth and sixth torque requests.

12. The engine control method of claim 11 further comprising:
when the mode signal is in a first state:
  setting the fifth torque request equal to the first torque request; and
  setting the sixth torque request equal to the second torque request; and
when the mode signal is in a second state:
  setting the fifth torque request equal to the third torque request; and
  setting the sixth torque request equal to the fourth torque request.

13. The engine control method of claim 12 further comprising setting the mode signal to one of the first state and the second state based on the driver torque request.

14. The engine control method of claim 13 further comprising:

setting the mode signal to the first state when the driver torque request is greater than a predetermined torque; and
setting the mode signal to the second state when the driver torque request is less than the predetermined torque.

15. The engine control method of claim 11 further comprising determining the driver torque request based on the accelerator pedal position and a third difference between the first difference and second difference.

16. The engine control method of claim 15 further comprising generating the third and fourth torque requests as a function of the target engine speed and the third difference.

17. The engine control method of claim 11 further comprising beginning increasing the driver torque request in response to an increase in the transmission input speed.

18. The engine control method of claim 11 further comprising determining the target engine speed based on the accelerator pedal position and a gear ratio.

19. The engine control method of claim 11 further comprising determining the transmission input speed based on a transmission output shaft speed and a gear ratio.

20. The engine control method of claim 11 further comprising, based on at least one of the fifth and sixth torque requests, selectively adjusting at least one of opening of a throttle valve, camshaft phasing, output of a boost device, spark timing, and fueling.

* * * * *